United States Patent [19]
Collins et al.

[11] Patent Number: 5,458,857
[45] Date of Patent: Oct. 17, 1995

[54] COMBINED REFORMER AND SHIFT REACTOR

[75] Inventors: Robert D. Collins, Derby; Michael J. Oakley, Derbyshire, both of England

[73] Assignee: Rolls-Royce, plc, Derby, England

[21] Appl. No.: 155,642

[22] Filed: Nov. 22, 1993

[30] Foreign Application Priority Data

Dec. 2, 1992 [GB] United Kingdom ............... 9225188

[51] Int. Cl.$^6$ ........................................ F28D 7/04
[52] U.S. Cl. .................. 422/198; 422/190; 422/195; 422/197; 422/201; 422/203; 422/211
[58] Field of Search ........................ 422/188–190, 422/193–195, 196–197, 198, 201, 202, 203, 211

[56] References Cited

U.S. PATENT DOCUMENTS

| | | | |
|---|---|---|---|
| 1,797,426 | 3/1931 | Larson | 423/656 |
| 3,334,971 | 8/1967 | James et al. | 422/197 |
| 3,438,759 | 4/1969 | Linden et al. | |
| 3,499,797 | 3/1970 | Hooper | 422/197 |
| 3,541,729 | 11/1970 | Dantowitz | |
| 3,615,217 | 10/1971 | O'Brien et al. | 23/213 |
| 3,796,547 | 3/1974 | Muenger | |
| 3,909,299 | 9/1975 | Corrigan | |
| 5,246,791 | 9/1993 | Fisher et al. | 429/16 |

FOREIGN PATENT DOCUMENTS

| | | |
|---|---|---|
| 0112613 | 7/1984 | European Pat. Off. |
| 0361648 | 4/1990 | European Pat. Off. |

OTHER PUBLICATIONS

DOE/ET/13323 Overview of Fuel–Processing Technologies for Fuel Cell Power Generation, Catalytica File No. 1036, dated Nov. 6, 1978.

*Primary Examiner*—Timothy M. McMahon
*Attorney, Agent, or Firm*—Cushman Darby & Cushman

[57] ABSTRACT

A combined reformer and shift reactor comprises a cylindrical reforming chamber arranged within and on the axis of a cylindrical vessel. An annular steam generator is arranged within, and coaxially with, the vessel. The steam generator is arranged around the reforming chamber. A plurality of shift reactors extend axially, with respect to the vessel, through the steam generator. Methane and steam are supplied via helically coiled pipe to the reforming chamber and air is supplied via helically coiled pipe. The methane and steam mixture and air flowing through the pipes are preheated by the reforming chamber product gases flowing in annular passage. The shift reactors convert carbon monoxide and water in the product gases to carbon dioxide and hydrogen and the heat produced is transferred to the water in the steam generator to produce steam.

35 Claims, 6 Drawing Sheets

COMBINED REFORMER AND SHIFT REACTOR

FIELD OF THE INVENTION

The present invention relates to the generation of hydrogen, for fuel cells or other purposes, by reforming hydrocarbon fuels.

BACKGROUND OF THE INVENTION

Methane, the major component of natural gas, is a potential source of hydrogen for fuelling fuel cells. However, the hydrogen in methane is chemically bound to the carbon and must be liberated by chemical processing before it can be used. The liberation of hydrogen from methane may be achieved by reforming.

One known method of reforming methane, or natural gas, is by catalytic steam reforming. In this process a mixture of steam and methane, or natural gas, is passed over a suitable catalyst at a high temperature. The catalyst may be nickel and the temperature is between 700° C. and 1000° C. Hydrogen is liberated according to the following overall reaction:

$$CH_4 + 2H_2O \rightarrow CO_2 + 4H_2$$

This reaction is a highly endothermic reaction and requires an external heat supply and a steam supply. Commercial steam reformers typically comprise externally heated, catalyst filled tubes and rarely have thermal efficiencies greater than 60%.

A further known method of reforming methane, or natural gas, is by catalytic partial oxidation reforming. In this process a mixture of methane, or natural gas, and an oxygen containing gas is passed over a suitable catalyst at a high temperature. The catalyst is normally a noble metal or nickel and the high temperature is between 700° C. and 1200° C. Hydrogen is liberated according to the following overall reaction:

$$CH_4 + O_2 \rightarrow CO_2 + 2H_2$$

This reaction is a highly exothermic reaction and once started generates sufficient heat to be self sustaining. No external heat supply or steam supply are required. The catalytic partial oxidation reforming technique is simpler than the catalytic steam reforming technique, but is not as thermally efficient as catalytic steam reforming.

An additional known method of reforming methane, or natural gas, is by autothermal reforming. In this process a mixture of methane, or natural gas, air or oxygen and steam is used to liberate hydrogen. The autothermal reformer uses a combination of catalytic steam reforming and catalytic partial oxidation reforming. The catalytic partial oxidation reforming reaction produces the heat for the catalytic steam reforming reaction. A correctly designed autothermal reformer is potentially far more efficient than a either a catalytic steam reformer or a catalytic partial oxidation reformer. Hydrogen is liberated according to the following overall reaction:

$$CH_4 + yH_2O + (1-y/2)O_2 \rightarrow CO_2 + (2+y)H_2O \quad y<2$$

Consideration of the standard enthalpies of formation shows that autothermal operation is theoretically achieved when $y=1.115$. At autothermal operation there is no net energy input or energy output.

In addition to the reforming reactions discussed above it is usually necessary to consider the effects of another reaction occurring, the so called "water gas shift reaction". In the water gas shift reaction the following overall reaction occurs:

$$CO + H_2O \rightarrow CO_2 + H_2$$

The equilibrium of this reversible reaction is temperature dependent. At high temperatures carbon monoxide and water tend to be produced, but at low temperatures carbon dioxide and hydrogen tend to be produced. Reformers produce carbon dioxide and hydrogen, and consequently some carbon dioxide and hydrogen react to produce carbon monoxide and water due to the water gas shift reaction occurring in the reforming chamber.

It is known to recover some hydrogen by passing the product gases leaving the reformer, after cooling, into a shift reactor where a suitable catalyst causes the carbon monoxide and water/steam to react to produce carbon dioxide and hydrogen. In addition to recovering otherwise lost hydrogen the shift reactor is important in fuel cell fuel processing systems because carbon monoxide acts as a severe anode catalyst poison in low temperature fuel cells, such as solid polymer electrolyte fuel cells. The shift reactor provides a convenient method of reducing the carbon monoxide content of the reformer product gases.

SUMMARY OF THE INVENTION

The present invention seeks to provide a novel combined reformer and shift reactor which is more thermally efficient than either a steam reformer or a partial oxidation reformer and which has increased hydrogen yield while maintaining low carbon monoxide levels.

Accordingly the present invention provides a combined reformer and low temperature shift reactor comprising at least one reforming chamber containing a reforming catalyst, means to supply a hydrocarbon containing material to the at least one reforming chamber, means to supply an oxygen containing gas to the reforming chamber, means to supply water to the at least one reforming chamber, at least one low temperature shift reaction chamber containing a low temperature shift reaction catalyst, means to transfer the product gases from the at least one reforming chamber to the at least one low temperature shift reaction chamber, outlet means from the at least one low temperature shift reaction chamber for the flow of hydrogen and carbon dioxide, and heat exchange means to transfer heat from the at least one low temperature shift reactor chamber to the water before the said water is supplied into the at least one reforming chamber.

The means to supply water may comprise a steam generator.

Preferably the at least one reforming chamber, the at least one low temperature shift reaction chamber and the at least one steam generator are arranged in a common vessel.

Preferably the steam generator and at least one low temperature shift reaction chamber form a combined unit.

Preferably the steam generator comprises a water containing tank and the at least one low temperature shift reaction chamber extends through the tank.

Alternatively the steam generator may comprise at least one water containing tube which extends through the at least one low temperature shift reaction chamber.

Preferably the vessel is generally cylindrical, the reforming chamber and steam generator are concentrically arranged about the axis of the vessel, the steam generator comprises a water containing tank, the at least one low temperature shift reaction chamber extends axially through the water containing tank.

Preferably the reforming chamber is generally cylindrical, the steam generator is annular and is arranged around and spaced from the reforming chamber.

Preferably the means to supply hydrocarbon containing material to the reforming chamber comprises a pipe extending through the space between the reforming chamber and the steam generator.

Preferably the means to supply steam to the reforming chamber comprises a pipe extending through the space between the reforming chamber and the steam generator.

Preferably the means to supply steam and the means to supply hydrocarbon containing material share a common pipe.

Preferably the means to supply oxygen containing gas to the reforming chamber comprises a pipe extending through the space between the reforming chamber and the steam generator.

Preferably the pipe is arranged in a helical coil.

Preferably the reforming chamber product gases are directed to flow through the space between the reforming chamber and the steam generator to transfer heat to the pipes and the steam generator.

Preferably the hydrocarbon containing material, steam and oxygen containing gas are supplied at a first end of the reforming chamber, the first end having a mixing chamber.

Preferably a second end of the reforming chamber is open to allow product gases to leave the reforming chamber and the second has means to retain the catalyst.

Preferably a shroud is arranged concentrically between the reforming chamber and the steam generator.

Preferably the pipes are arranged between the shroud and the reforming chamber, the shroud is arranged over the second end of the reforming chamber to cause the product gases to flow through the space between the shroud and the reforming chamber, the steam generator has a member arranged over the first end of the reforming chamber to cause the product gases flowing through the shroud to flow through the space between the shroud and the steam generator.

Alternatively the pipes are arranged between the shroud and the steam generator, the shroud is arranged over the second end of the reforming chamber to cause the product gases to flow through the space between the shroud and the reforming chamber, the steam generator has a member arranged over the first end of the reforming chamber to cause the product gases flowing through the shroud to flow through the space between the shroud and the steam generator.

Preferably the reforming catalyst includes a noble metal. Preferably the noble metal catalyst comprises platinum. A nickel catalyst may be used in addition to the noble metal catalyst.

Preferably the shift reaction catalyst comprises a copper/zinc catalyst.

Preferably means are provided to supply hydrogen, or methanol, to the reforming chamber to allow the hydrogen, or methanol, to burn at ambient temperature to raise the temperature of the catalyst to a suitable temperature for the reaction of hydrocarbon containing material on the catalyst.

Further heat exchange means may be provided to transfer heat from the reforming chamber product gases to at least one of the hydrocarbon containing material, the steam, and the oxygen containing gas before the said at least one hydrocarbon containing material, steam or oxygen containing gas is supplied into the reforming chamber.

Additional heat exchange means may be provided to transfer heat from the reforming chamber product gases to the water tank.

Preferably the hydrocarbon containing material is preheated by the reforming chamber product gases before the steam is mixed with the hydrocarbon containing material.

The present invention also provides a combined reformer and low temperature shift reactor comprising a reforming chamber containing a reforming catalyst, means to supply a hydrocarbon containing material to the reforming chamber, means to supply oxygen containing gas to the reforming chamber, means to supply steam to the reforming chamber, at least one low temperature shift reaction chamber containing a low temperature shift reaction catalyst, means to transfer the reforming chamber product gases to the at least one low temperature shift reaction chamber, outlet means from the at least one low temperature shift reaction chamber for the flow of hydrogen and carbon dioxide, the means to supply steam to the reforming chamber comprising a steam generator, heat exchange means to transfer heat from the at least one low temperature shift reactor chamber to the steam generator.

Heating means may be provided to heat thesteam generator.

The heating means may comprise at least one hollow chamber extending through the steam generator, the at least one hollow chamber containing a combustion catalyst, means to supply an oxidant to the at least one hollow member and means to supply a portion of the product gases from the low temperature shift reaction chamber into the at least one hollow member.

The heating means may comprise a plurality of hollow members.

Preferably the at least one low temperature shift reaction chamber contains a low temperature shift reaction catalyst suitable for operating at a temperature between 140° C. and 250° C. Preferably the at least one low temperature shift reaction chamber contains a low temperature shift reaction catalyst suitable for operating at a temperature between 170° C. and 220° C.

Preferably the steam generator has valve means to control the pressure in the steam generator whereby the temperature of the at least one steam generator and the at least one low temperature shift reaction chamber is controlled.

The present invention will be more fully described by way of example with reference to the accompanying drawings in which:

DETAILED DESCRIPTION OF THE INVENTION

Figure 1:
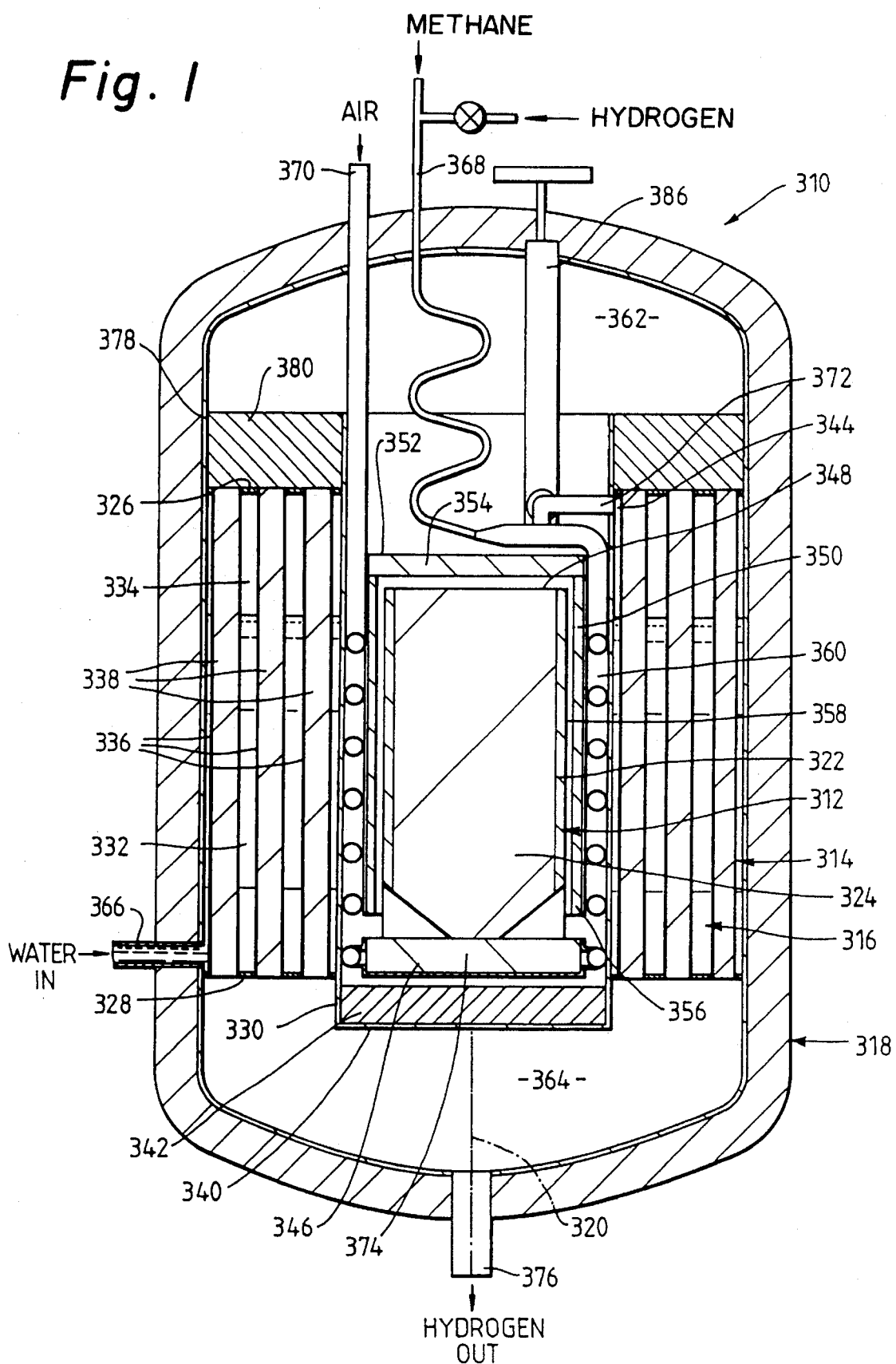
FIG. 1 is a vertical cross-sectional view through a combined reformer and shift reactor according to the present invention.
Figure 2:
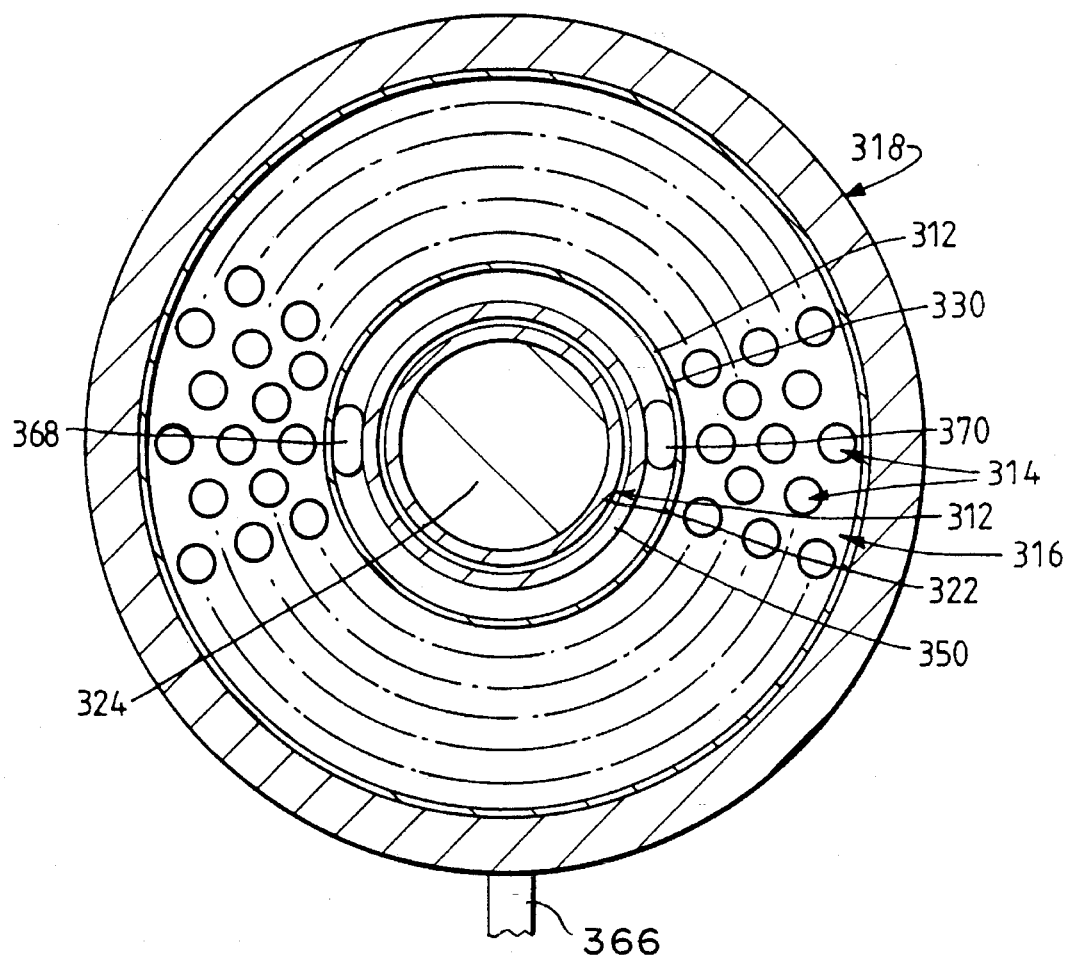
FIG. 2 is a horizontal cross-sectional view through the combined reformer and shift reactor shown in FIG. 1.

A combined reformer and shift reactor 310, shown in FIG. 1 and 2, comprises a reformer 312, a plurality of low temperature shift reactors 314 and a steam generator 316 all arranged within a common vessel 318.

The vessel 318 is generally cylindrical, and has an axis 320. The vessel 318 is insulated. The reformer 312 comprises a generally cylindrical reforming chamber 322 which contains a packed catalyst bed 324. The cylindrical reforming chamber 322 is arranged substantially concentric with, and within, the vessel 318. The catalyst 324 is suitable for high temperature catalytic partial oxidation reforming and catalytic steam reforming, i.e. autothermal reforming, of a hydrocarbon fuel to produce hydrogen and carbon dioxide. The catalyst 324 is preferably nickel with amounts of a noble metal, for example platinum. Alternatively the catalyst may be simply a noble metal, e.g. platinum, or simply nickel.

The low temperature shift reactors 314 and steam generator 316 form a combined unit and have a generally annular cross-section. The low temperature shift reactors 314 and steam generator 316 are arranged in an annular space between the reforming chamber 322 and the vessel 318. The steam generator 316 comprises an annular tank which is defined by an upper wall 326, a lower wall 328, by the vessel 318, which form a radially outer wall and by a cylindrical wall 330 which forms a radially inner wall. The steam generator 316 tank contains, in operation, a water space 332 and a steam space 334. Each low temperature shift reactor 314 comprises a tube 336 which is filled with a suitable low temperature shift reaction catalyst 338, for example copper/zinc low temperature shift catalyst. The low temperature shift reactors 314 pass axially, with respect to the vessel 318, through the steam generator 316.

The reforming chamber 322 is spaced from the cylindrical wall 330 to form an annular gap therebetween. The lower end 340 of the cylindrical wall 330 is closed and a layer of insulation 342 is arranged at the lower end of the cylindrical wall 330. The upper end 344 of the cylindrical wall 330 is open. The lower end 346 of the reforming chamber 322 is spaced from the closed lower end of the cylindrical wall 330, and is closed. The upper end 348 of the reforming chamber 322 is open and has a perforated plate to retain the catalyst while allowing free passage of gases. The vertical sides of the reforming chamber 322 are provided with insulation 387. A cylindrical shroud 350 is arranged coaxially between the reforming chamber 322 and the cylindrical wall 330. The upper end 52 of the shroud 350 is closed and a layer of insulation 354 is arranged at the upper end of the shroud 350. The upper end 352 of the shroud 350 is spaced from the open upper end of the reforming chamber 322. The shroud 350 is provided with insulation on its inner surface. The lower end 356 of the shroud 350 is open and extends below the lower end of the reforming chamber 322 but is spaced from the closed lower end of the cylindrical wall 330.

The reforming chamber 322 and the shroud 350 define a first annular passage 358, and a second annular passage 360 is defined between the shroud 350 and the cylindrical wall 330. An upper chamber 362 is defined within the vessel 318 above the reforming chamber 322, low temperature shift reactors 314 and steam generator 316. A lower chamber 364 is defined within the vessel 318 below the reforming chamber 322, low temperature shift reactors 314 and steam generator 316. The annular passages 358 and 360 and upper chamber 362 provide an interconnection between the reforming chamber 322 and the low temperature shift reactors 314 for the flow of reforming chamber 322 product gases. The lower chamber 364 collects hydrogen and other gases leaving the low temperature shift reactors 314.

A pipe 366 is provided to supply water to the steam generator 316. A pipe 368 is provided to supply methane, or natural gas, to the lower end 346 of the reforming chamber 322 and a pipe 370 is provided to supply air, or oxygen, to the lower end of the reforming chamber 322. The pipes 368 and 370 pass through apertures in the top of the vessel 318. A pipe 372 supplies steam from the steam generator 316 to the lower end 346 of the reforming chamber 322. The pipe 372 is interconnected to the pipe 368. The lower end of the reforming chamber 322 is provided with a mixing chamber 374 to mix the flows of steam, methane and air into the reforming chamber 322. The pipes 368 and 370 are arranged in helical coils in the annular passage 360 between the shroud 350 and the cylindrical wall 330.

Two different catalyst systems may be used in the reforming chamber 322. Either the whole of the catalyst is a noble metal e.g. platinum or two catalysts may be used in two distinct zones. In the two zone system the upstream catalyst is a noble metal and the downstream catalyst is nickel. The upstream catalyst is used to ensure that the oxygen reacts with the methane thus generating the heat required for the subsequent endothermic reactions which are carried out in the downstream catalyst. The noble metal catalyst will support the endothermic reaction but is more expensive. The noble metal aids the start up of the process in that it provides a means of ignition using hydrogen or methanol at low temperatures.

An annular tank 378 is located in the upper chamber 362 and the tank 378 contains zinc oxide 380. The zinc oxide 380 is placed downstream of the reforming chamber 322 and upstream of the low temperature shift reactors 314. Zinc oxide is used to protect the low temperature shift catalyst against sulphur poisoning. As will be readily understood by those skilled in the art, the zinc oxide is of the type that is comercially available and is typically in granular form, pellets or extrudates which allows passage of a gas therethrough. Under the conditions prevailing in the reforming chamber any sulphur bearing species present in the hydrocarbon feed, for example mercaptans and organic sulphides are broken down to hydrogen sulphide and carbonyl sulphide. Hydrogen sulphide and carbonyl sulphide are removed from the reforming chamber product gases by reaction with the zinc oxide to form zinc sulphide. Where the hydrocarbon fuel contains large amounts of sulphur bearing species, sulphur removal is preferably provided prior to the reforming chamber to afford protection to the reforming catalyst.

In operation the methane and air are supplied through the pipes 368 and 370 respectively. The methane and air passing through the pipes 368 and 370 respectively is preheated by the reforming chamber 322 product gases in upper chamber 362 thus providing a further heat exchange means. Steam produced in the steam generator 316 and supplied through the pipe 372 is mixed with the preheated methane flowing through the pipe 368. The preheating of the methane before the steam is mixed with the methane prevents the quenching of the steam.

The methane/steam mixture and air passing through the helically coiled portions of pipes 368 and 370 respectively are further preheated by the reforming chamber 322 product gases flowing through the second annular passage 360. The methane/steam mixture and air are then supplied into the reforming chamber 322 at its lower end 346. The mixing chamber 374 causes the methane/steam mixture and air to mix prior to entry into the reforming chamber 322.

The methane reacts on the catalyst 324 with the oxygen and steam to produce the product gases hydrogen, carbon dioxide and carbon monoxide. The product gases leave the open upper end 348 of the reforming chamber 322 and are diverted downwards through the first annular passage 358 between the shroud 350 and the reforming chamber 322. The product gases are then directed upwards through the second annular passage 360 between the shroud 350 and the cylindrical wall 330 to the upper chamber 362. The product gases give up heat to the reactant gases in the pipes 368 and 370 as they flow through the second annular passage 360. The product gases additionally give up heat to the water in the steam generator 316 through the cylindrical wall 330 thus constituting an additional heat exchange means.

The reforming chamber 322 product gases then flow downwards from the upper chamber 362 through the low temperature shift reactors 314 to the lower chamber 364. The low temperature shift reactors 314 convert the carbon monoxide and water in the product gases to carbon dioxide and hydrogen on the low temperature shift reaction catalyst 332, which thus performs the function of the further heat exchange means in the upper chamber 362. Below wall 352, the pipes 368 and 370 are wrapped about the reforming chamber 322, as explained below, and this positioning of the pipes 368 and 370 provides the additional heat exchanger operation. Heat generated by the low temperature shift reaction, and heat in the product gases, is transferred through the tubes 314 into the water in the steam generator 316. The steam is then supplied via pipe 372 to the pipe 368 carrying the methane. The transferal of heat from the low temperature shift reactors 314 to the steam generator 316 enables the temperature in the low temperature shift reactors 314 to be reduced and hence favour the production of hydrogen and carbon monoxide by the low temperature shift reaction.

The gases leaving the low temperature shift reactors 314 are supplied into the lower chamber 364 and then via outlet pipe 376 to a fuel cell stack, or other process, machine or device requiring hydrogen.

From a cold start no steam is available for the reforming chamber 322 from the steam generator 316. Steam is available once the steam generator 316 has reached operating temperature. Therefore the reforming chamber 322 operates as a purely partial oxidation reformer until the steam generator 316 has reached operating temperature. Thereafter the reforming chamber 322 operates as an autothermal reformer.

Cooling of the low temperature shift reactors 314 is provided by the steam generator 316 water 332. Ideally the low temperature shift catalyst 338 is operated at a temperature between 140° C. and 220° C. to obtain low carbon monoxide concentration whilst maintaining reasonably fast carbon monoxide shift kinetics, thereby reducing the quantity of low temperature shift catalyst required. The temperature of the steam generator 316 and therefore the temperature of the low temperature shift reaction catalyst 338 is controlled by regulating the temperature of the steam generator 316. The temperature of the steam generator 316 is controlled by controlling the pressure of the steam generator 316 via the valve 386.

The steam generator 316 and water 332 in the steam generator 316 form an energy store which aids the transient response of the unit, allowing a rapid increase in the steam generation rate by a small reduction in the steam generator 316 pressure. As the fuel and air supplies are increased to achieve a positive power transient the steam generator 316 pressure is allowed to fall by adjusting the valve 386. A positive power transient is indicated by an increase in reformer reactant throughput such as the methane, air and water consumption rates to generate more hydrogen to meet increased electrical power demands at the fuel cell. The increased steam production brings the fuel/oxidant ratio rapidly back into balance for efficient autothermal operation of the system.

Figure 3:
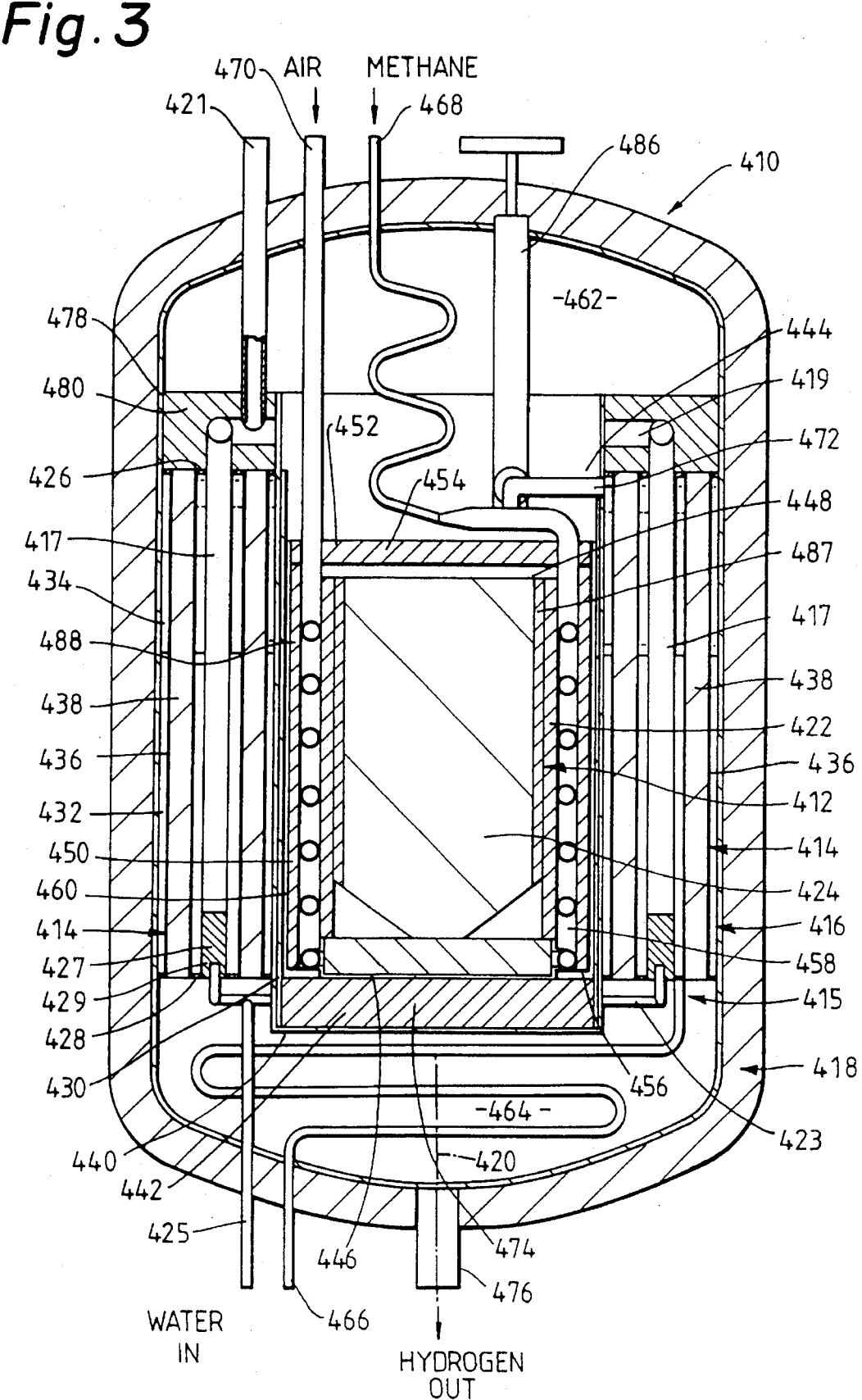
FIG. 3 is a vertical cross-sectional view through an additional combined reformer and shift reactor according to the present invention.
Figure 4:
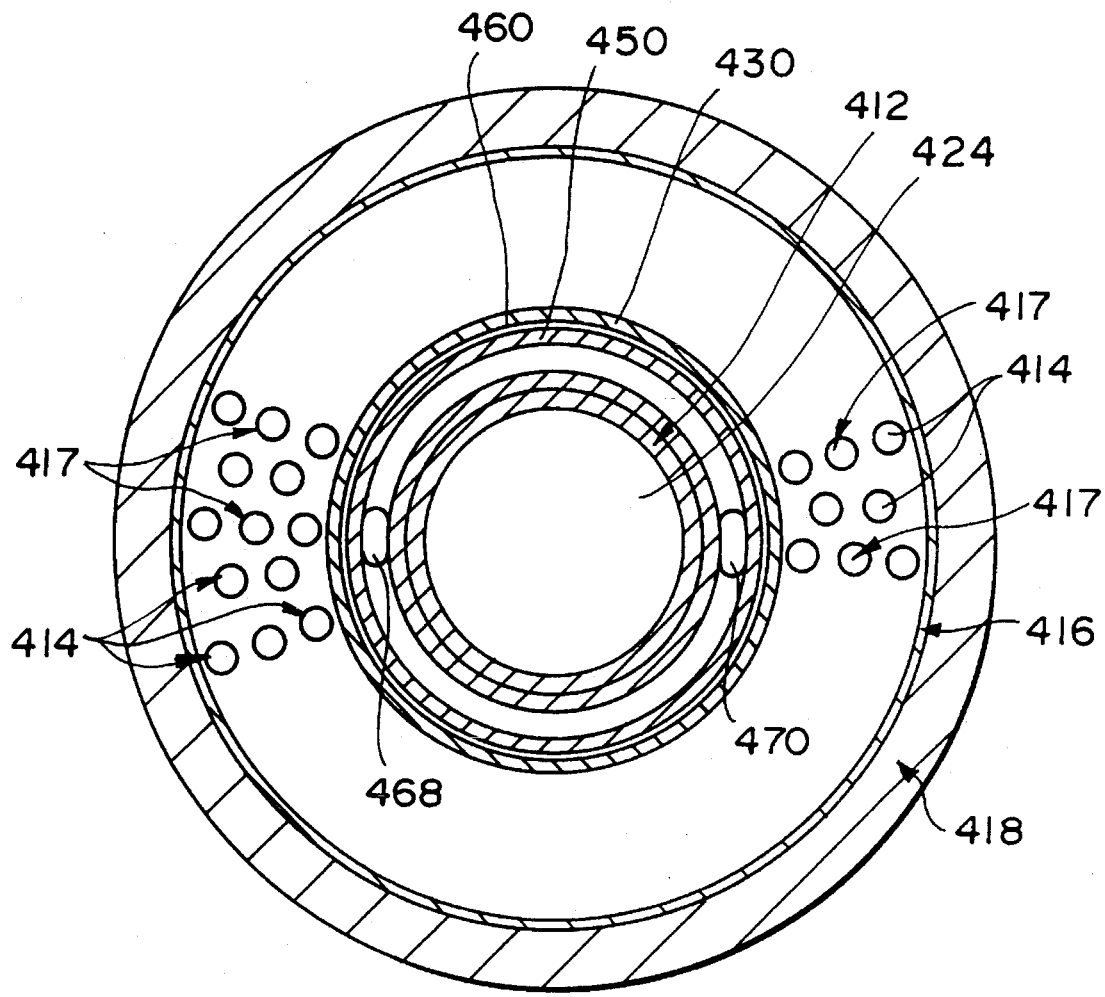
FIG. 4 is a horizontal cross-section view through the combined reformer and shift reactor shown in FIG. 3.
Figure 5:
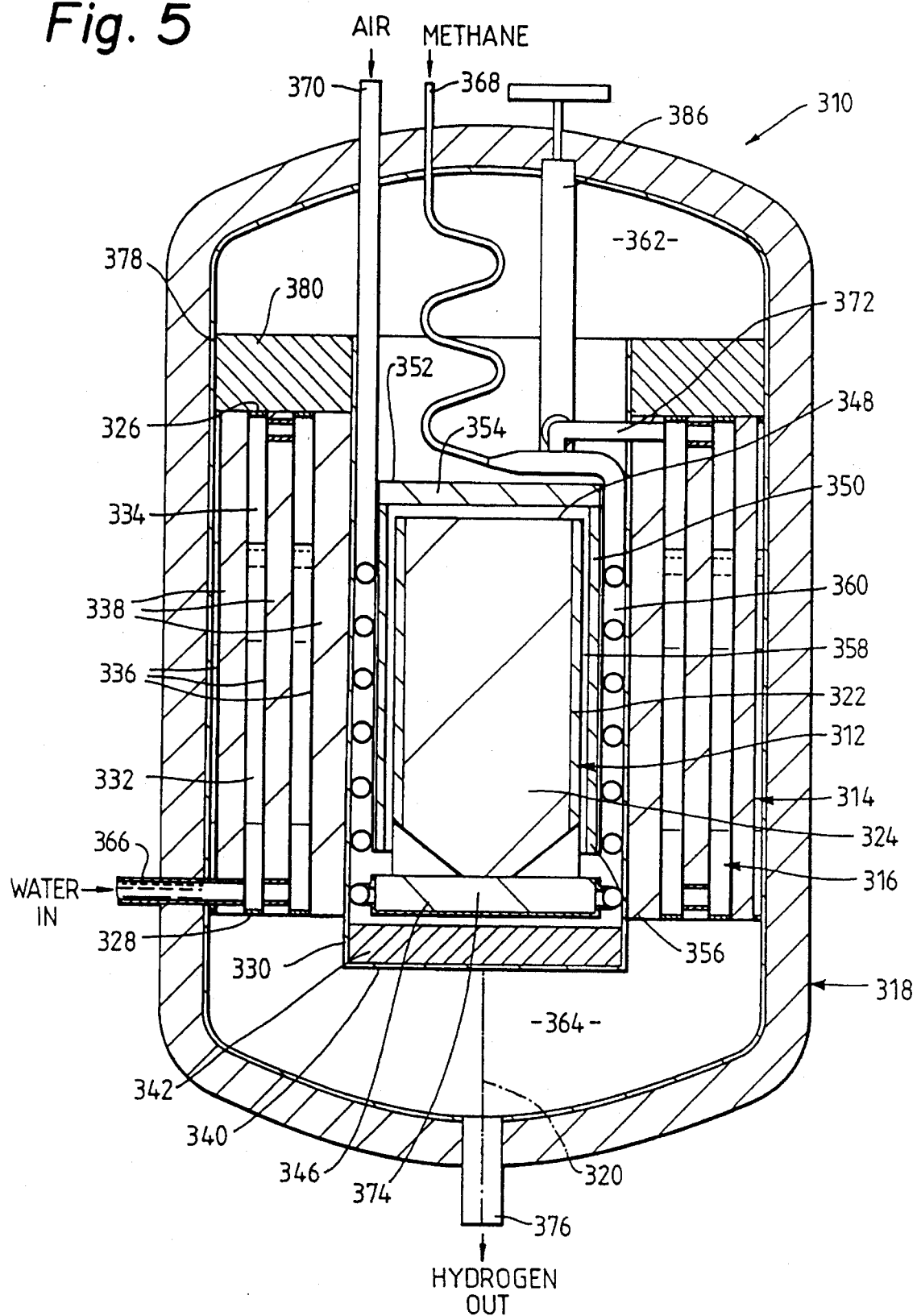
FIG. 5 is vertical cross-sectional view through a combined reformer and shift reactor showing a water containing tube extending through a low temperature shift reaction chamber.

A combined reformer and shift reactor 410, shown in FIG. 3, comprises a reformer 412, a plurality of low temperature shift reactors 414, a steam generator 416 and a rapid start up system 415 all arranged within a common vessel 418.

The vessel 418 is generally cylindrical, and has an axis 420. The vessel 318 is insulated. The reformer 412 comprises a generally cylindrical reforming chamber 422 which contains a packed catalyst bed 424. The cylindrical reforming chamber 422 is arranged substantially concentric with, and within, the vessel 418. The catalyst 424 is suitable for high temperature catalytic partial oxidation reforming and catalytic steam reforming, i.e. autothermal reforming, of a hydrocarbon fuel to produce hydrogen and carbon dioxide. The catalyst 424 is preferably nickel with amounts of a noble metal, for example platinum. Alternatively the catalyst may be simply a noble metal, e.g. platinum, or simply nickel.

Figure 6:
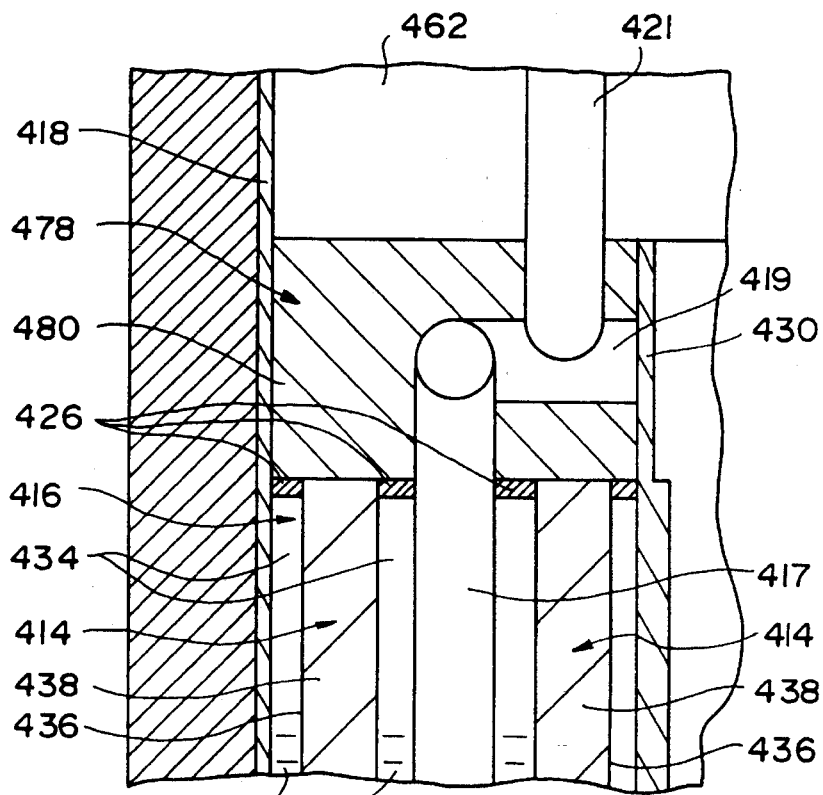
FIGS. 6 and 7 are, respectively, enlarged sectional views of the upper and lower portions of the reactor of FIG. 3.

The low temperature shift reactors 414 and steam generator 416 form a combined unit and have a generally annular cross-section. The combined unit also has the start-up system 415. The low temperature shift reactors 414 and steam generator 416 are arranged in an annular space between the reforming chamber 422 and the vessel 418. The steam generator 416 comprises an annular tank which is defined by an upper wall 426 and a lower wall 428 by the vessel 418, which form a radially outer wall and by a cylindrical wall 430 which forms a radially inner wall. The steam generator 416 tank contains, in operation, a water space 432 and a steam space 434 as shown more clearly in the enlarged view of FIG. 6. Each low temperature shift reactor 414 comprises a tube 436 which is filled with a suitable low temperature shift reaction catalyst 438, for example copper/zinc low temperature shift catalyst. The low temperature shift reactors 414 pass axially, with respect to the vessel 418, through the steam generator 416.

In addition to the low temperature shift reactors 414, a plurality of start-up tubes 417 extend axially, with respect to the vessel 418, through the steam generator 416. Each start-up tube 417 is connected at a first end, its upper end, to an exhaust manifold 419. The exhaust manifold 419 has an exhaust duct 421 which passes through the vessel 418 to atmosphere. Each start-up tube 417 is connected at a second end, its lower end, to an inlet manifold 423. The inlet manifold 423 has an inlet duct 425 which passes through the vessel 418, and the inlet duct 425 is supplied with an oxidant e.g. air or oxygen. A portion 427 of each start-up tube 417 contains a combustion catalyst 429, the combustion catalyst 429 is preferably noble metal e.g. platinum on a suitable support e.g. alumina.

The reforming chamber 422 is spaced from the cylindrical wall 430 to form an annular gap therebetween. The lower end 440 of the cylindrical wall 430 is closed and a layer of insulation 442 is arranged at the lower end of the cylindrical wall 430. The upper end 444 of the cylindrical wall 430 is open. The lower end 446 of the reforming chamber 422 is spaced from the closed lower end of the cylindrical wall 430, and is closed. The upper end 448 of the reforming chamber 422 is open and has a perforated plate to retain the catalyst while allowing free passage of gases. The vertical sides of the reforming chamber 442 are provided with insulation 487. A cylindrical shroud 450 is arranged coaxially between the reforming chamber 422 and the cylindrical wall 430. The upper end 452 of the shroud 450 is closed and a layer of insulation 454 is arranged at the upper end of the shroud 450. The upper end 452 of the shroud 450 is spaced from the open upper end of the reforming chamber 422. The shroud 450 is provided with insulation 488 on its inner surface. The lower end 456 of the shroud 450 is open and extends below the lower end of the reforming chamber 422 but is spaced from the closed lower end of the cylindrical wall 430.

The reforming chamber 422 and the shroud 450 define a first annular passage 458, and a second annular passage 460 is defined between the shroud 450 and the cylindrical wall 430. An upper chamber 462 is defined within the vessel 418 above the reforming chamber 422, low temperature shift reactors 414 and steam generator 416. A lower chamber 464 is defined within the vessel below the reforming chamber 422, low temperature shift reactors 414 and steam generator 416. The annular passages 458 and 460 and upper chamber 462 provide an interconnection between the reforming chamber 422 and the low temperature shift reactors 414 for the flow of reforming chamber 422 product gases. The lower chamber 464 collects hydrogen and other gases leaving the low temperature shift reactors 414.

A pipe 466 is provided to supply water to the steam generator 416. The pipe 466 passes through the lower chamber 464, such that the water is preheated as it passes through the pipe 466 by heat exchange with the product gases in the lower chamber 464. The pipe 466 is preferably helically coiled, however other suitable heat exchange arrangements may be used. A pipe 468 is provided to supply methane, or natural gas, to the lower end 446 of the reforming chamber 422 and a pipe 470 is provided to supply air, or oxygen, to the lower end of the reforming chamber 422. The pipes 468 and 470 pass through apertures in the top of the vessel 418. A pipe 472 supplies steam from the steam generator 416 to the lower end 446 of the reforming chamber 422. The pipe 472 is interconnected to the pipe 468. The lower end of the reforming chamber 422 is provided with a mixing chamber 474 to mix the flows of steam, methane and air into the reforming chamber 422. The pipes 468 and 470 are arranged in helical coils in the annular passage 458 between the shroud 350 and the reforming chamber 422.

Two different catalyst systems may be used in the reforming chamber 422. Either the whole of the catalyst is a noble metal e.g. platinum or two catalysts may be used in two distinct zones. In the two zone system the upstream catalyst is a noble metal and the downstream catalyst is nickel. The upstream catalyst is used to ensure that the oxygen reacts with the methane thus generating the heat required for the subsequent endothermic reactions which are carried out in the downstream catalyst. The noble metal catalyst will support the endothermic reaction but is more expensive. The noble metal aids the start up of the process in that it provides a means of ignition using hydrogen or methanol at low temperatures.

An annular tank 478 is located in the upper chamber 462 and the tank 478 contains zinc oxide 480. The zinc oxide 480 is placed downstream of the reforming chamber 422 and upstream of the low temperature shift reactors 414. Zinc oxide is used to protect the low temperature shift catalyst against sulphur poisoning. Under the conditions prevailing in the reforming chamber any sulphur bearing species present in the hydrocarbon feed, for example mercaptans and organic sulphides are broken down to hydrogen sulphide and carbonyl sulphide. Hydrogen sulphide and carbonyl sulphide are removed from the reforming chamber product gases by reaction with the zinc oxide to form zinc sulphide. Where the hydrocarbon fuel contains large amounts of sulphur bearing species, sulphur removal is preferably provided prior to the reforming chamber to afford protection to the reforming catalyst.

In operation the fuel and air are supplied through the pipes 468 and 470 respectively. The fuel and air passing through the pipes 468 and 470 respectively is preheated by the reforming chamber 422 product gases in upper chamber 462. Steam produced in the steam generator 416 and supplied through the pipe 472 is mixed with the preheated fuel flowing through the pipe 468. The preheating of the fuel before the steam is mixed with the fuel prevents the quenching of the steam.

The fuel/steam mixture and air passing through the helically coiled portions of pipes 468 and 470 respectively are further preheated by the reforming chamber 422 product gases flowing through the first annular passage 458. The fuel/steam mixture and air are then supplied into the reforming chamber 422 at its lower end 446. The mixing chamber 474 causes the fuel/steam mixture and air to mix prior to entry into the reforming chamber 422.

The fuel reacts on the catalyst 424 with the oxygen and steam to produce the product gases hydrogen, carbon dioxide and carbon monoxide. The product gases leave the open upper end 448 of the reforming chamber 422 and are diverted downwards through the first annular passage 458 between the shroud 450 and the reforming chamber 422. The product gases are then directed upwards through the second annular passage 460 between the shroud 450 and the cylindrical wall 430 to the upper chamber 462. The product gases give up heat to the reactant gases in the pipes 468 and 470 as they flow through the first annular passage 458. The product gases additionally give up heat to the water in the steam generator 416 through the cylindrical wall 430.

The reforming chamber 422 product gases then flow downwards from the upper chamber 462 through the low temperature shift reactors 414 to the lower chamber 464. The low temperature shift reactors 414 convert the carbon monoxide and water in the product gases to carbon dioxide and hydrogen on the low temperature shift reaction catalyst 432. Heat generated by the low temperature shift reaction, and heat in the product gases, is transferred through the tubes 414 into the water in the steam generator 416. The steam is then supplied via pipe 472 to the pipe 468 carrying the fuel. The transferal of heat from the low temperature shift reactors 414 to the steam generator 416 enables the temperature in the low temperature shift reactors 414 to be reduced and hence favour the production of hydrogen and carbon monoxide by the low temperature shift reaction.

The gases leaving the low temperature shift reactors 414 are supplied into the lower chamber 464 and then via outlet pipe 476 to a fuel cell stack, or other process, machine or device requiring hydrogen.

From a cold start no steam is available for the reforming chamber 422 from the steam generator 416. Steam is available once the steam generator 416 has reached operating temperature. Therefore the reforming chamber 422 operates as a purely partial oxidation reformer until the steam generator 416 has reached operating temperature. Thereafter the reforming chamber 422 operates as an autothermal reformer.

Cooling of the low temperature shift reactors 414 is provided by the steam generator 416 water 432. Ideally the low temperature shift catalyst 432 is operated at a temperature between 140° C. and 220° C. to obtain low carbon monoxide concentration whilst maintaining reasonably fast carbon monoxide shift kinetics, thereby reducing the quantity of low temperature shift catalyst required. The temperature of the steam generator 416 and therefore the temperature of the low temperature shift reaction catalyst 432 is controlled by regulating the temperature of the steam generator 416. The temperature of the steam generator 416 is controlled by controlling the pressure of the steam generator 416 via the valve 486.

The steam generator 434 and water 432 in the steam generator 416 form an energy store which aids the transient response of the unit, allowing a rapid increase in the steam generation rate by a small reduction in the steam generator 416 pressure. As the fuel and air supplies are increased to achieve a positive power transient the steam generator 416 pressure is allowed to fall by adjusting the valve 486. The increased steam production brings the fuel/oxidant ratio rapidly back into balance.

Figure 7:
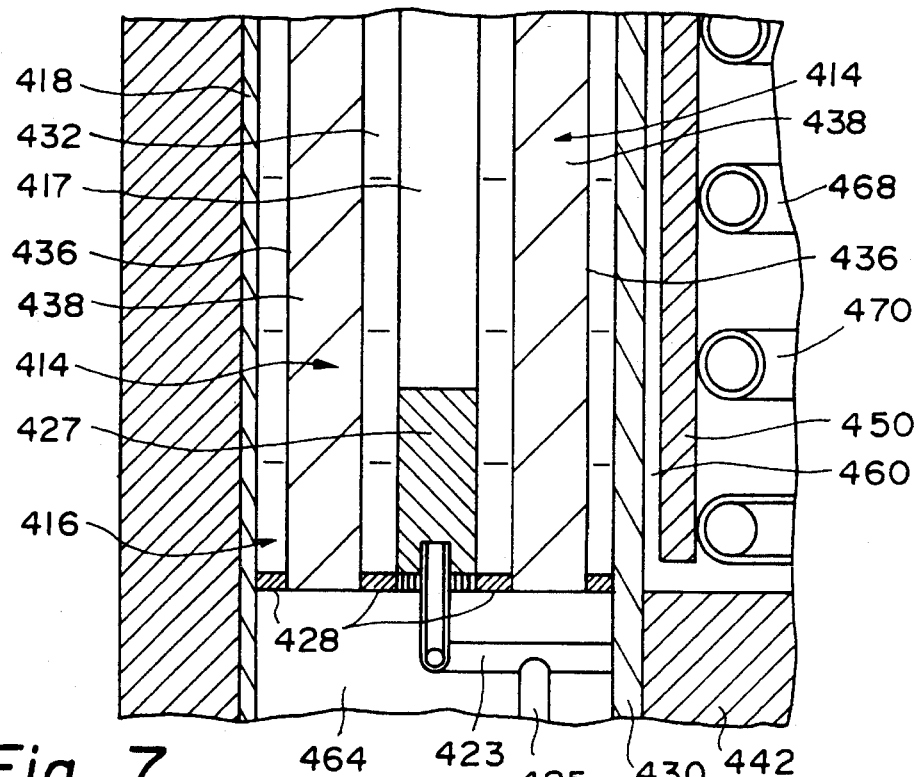

To bring the shift reactors 414 and the steam generator 416 rapidly up to the required operating temperature the rapid start up system 415 is used. The start-up tubes 417 are supplied with a portion of the product gases leaving the low temperature shift reactors 414 at start up, since the lower end of each of the start-up tubes 417 are open as shown in FIG. 7 so that the product gases may flow into the start-up tubes to contact the catalyst 427. The product gases leaving the low temperature shift reactors are rich in hydrogen and carbon monoxide. The oxidant gas is supplied through pipe 425 and manifold 423 to the start-up tubes 417. The noble metal catalyst 429 in each start-up tube 417 combusts the low temperature shift reactor 414 product gases and oxidant to generate heat in the start-up tubes 417. The heat is transferred into the steam generator 416 and hence to the low temperature shift reactors 414. The exhaust gases leave the start-up tubes 417 via the exhaust manifold 419 and pipe 421.

The combined reformer and shift reactor produces a hydrogen rich gas of low carbon monoxide content from methane in a compact volume. This is achieved using autothermal reforming and by incorporating reforming and carbon monoxide shift in one vessel to facilitate efficient heat transfer between each one of these processes. This is more thermally efficient than conventional reforming equipment especially at low production rates.

The combined reformer and shift reactor of the present invention produces hydrogen at low flow rates with a high thermal efficiency. The unit is compact, and produces hydrogen of a quality suitable for fuel cells in a single unit. No external heat transfer equipment is required to preheat the reactants or to generate steam. The unit has good load following characteristics and good turn down capability.

In order to start up the combined reformer and shift reactors 310 or 410 hydrogen, or methanol, and an oxygen containing gas is supplied to the reforming chamber 322 or 422. The hydrogen, or methanol, reacts on the noble metal catalyst at room temperature and provides heat to raise the temperature in the reforming chamber to self sustaining temperature e.g. 600° C. The normal operating temperature in the reforming chamber is 700° C. to 1200° C. The hydrogen, or methanol, may be supplied to the reforming chamber alone or as a mixture of hydrogen, or methanol, and methane. The supply of hydrogen, or methanol, is then terminated and only methane is supplied. The use of platinum group catalysts to promote start up from cold conditions is reported at pages 5 to 35 in DOE/ET/13323—Overview of Fuel Processing technologies for Fuel Cell Power Generation by Catalytica Associates Inc in 1978 and also in Schmulder, von P., Brennstoff-Chemie 46, 23 (1965) light up from low temperature in an autothermal reformer using platinum.

It may also be possible to use any other suitable means of raising the temperature in the reforming chamber, for example electrical heating.

Although the description has referred to the use of methane to produce the hydrogen it may equally be possible to use other hydrocarbon fuels, for example natural gas, methanol, ethane, ethanol, naphtha, kerosene, diesel etc. It is clear to a person skilled in the art that the reforming chamber, steam generator, low temperature shift reactors and vessel need not be limited to having circular or annular cross-sections, any suitable shape promoting heat transfer from the reformed gases in the low temperature shift reactor to the reactants may be used.

The oxygen containing gas may be pure oxygen, air or oxygen enriched air.

It is also possible to arrange the low temperature shift reactors to be on the shell side of the heat exchanger and pass the reactants through the tube side of the heat exchanger. It is also possible to use other suitable heat exchanger arrangements to transfer heat between the low temperature shift reactors and the steam generator e.g. plate fin heat exchangers etc. It is also possible to arrange the combined steam generator and low temperature shift reactor unit in axially spaced relationship to the reformer chamber.

The low temperature shift reactors are operated at a temperature between 140° C. and 250° C., but it is preferred to operate the low temperature shift reactors at a temperature between 170° C. and 220° C. However it may be possible to operate the low temperature shift reactors at a broader temperature range between 110° C. and 250° C. with suitable low temperature shift reaction catalysts.

It is to be noted that the product gases of the reforming chamber transfer heat firstly to the steam, oxidant and fuel to be supplied to the reforming chamber, the product gases of the reforming chamber transfer heat secondly to the water in the steam generator and thirdly the shift reaction chambers transfer heat to the steam generator.

We claim:

1. A combined reformer and low temperature shift reactor comprising a reforming chamber containing a reforming catalyst, means to supply a hydrocarbon-containing material to the reforming chamber, means to supply oxygen-containing gas to the reforming chamber, means to supply steam to the reforming chamber, the means to supply steam to the reforming chamber comprising a steam generator, at least one low temperature shift reaction chamber containing a low temperature shift reaction catalyst for producing product gases, means to transfer the reforming chamber product gases to the at least one low temperature shift reaction chamber, outlet means from the at least one low temperature shift reaction chamber for the flow of hydrogen and carbon dioxide, at least one heat exchanger member being arranged to at least partially define the steam generator and to at least partially define the at least one low temperature shift reaction chamber, with said heat exchanger member having one side thereof in contact with water and an opposite side in contact with said shift reaction catalyst to allow the transfer of heat from the at least one low temperature shift reaction chamber to the steam generator.

2. A combined reformer and low temperature shift reactor as claimed in claim 1 in which the low temperature shift reaction catalyst comprises a copper/zinc catalyst.

3. A combined reformer and low temperature shift reactor as claimed in claim 1 in which further heat exchange means transfers heat from the reforming chamber product gases to at least one of the hydrocarbon containing material, the steam, and the oxygen containing gas before the said at least one hydrocarbon containing material, steam or oxygen containing gas is supplied into the reforming chamber.

4. A combined reformer and low temperature shift reactor as claimed in claim 1 in which additional heat exchange means transfers heat from the reforming chamber product gases to the steam generator.

5. A combined reformer and low temperature shift reactor as claimed in claim 1 in which heating means are provided to heat the steam generator, the heating means comprises at least one hollow member extending through the steam generator, the at least one hollow member containing a combustion catalyst, means to supply an oxidant to the at least one hollow member and means to supply a portion of the product gases from the low temperature shift reaction chamber into the at least one hollow member.

6. A combined reformer and low temperature shift reactor as claimed in claim 1 in which the steam generator has valve means to control the pressure in the steam generator whereby the temperature of the at least one steam generator and at least one low temperature shift reaction chamber is controlled.

7. A combined reformer and low temperature shift reactor as claimed in claim 1 in which the at least one low temperature shift reaction chamber contains a low temperature shift reaction catalyst suitable for operating at a temperature between 140° C. and 250° C.

8. A combined reformer and low temperature shift reactor as claimed in claim 7 in which the at least one low temperature shift reaction chamber contains a low temperature shift reaction catalyst suitable for operating at a temperature between 170° C. and 220° C.

9. A combined reformer and low temperature shift reactor as claimed in claim 1 in which the steam generator and at least one low temperature shift reaction chamber form a combined unit.

10. A combined reformer and low temperature shift reactor as claimed in claim 9 in which the steam generator comprises a water containing tank and the at least one low temperature shift reaction chamber extends through the tank.

11. A combined reformer and low temperature shift reactor as claimed in claim 9 in which the steam generator comprises at least one water containing tube which extends through the at least one low temperature shift reaction chamber.

12. A combined reformer and low temperature shift reactor as claimed in claim 1 in which the reforming catalyst includes a noble metal.

13. A combined reformer and low temperature shift reactor as claimed in claim 12 in which the noble metal catalyst comprises platinum.

14. A combined reformer and low temperature shift reactor as claimed in claim 12 in which the reforming catalyst additionally includes a nickel catalyst catalyst.

15. A combined reformer and low temperature shift reactor as claimed in claim 14 in which means are provided to supply hydrogen, or methanol, to the reforming chamber to allow the hydrogen, or methanol, to burn at ambient temperature to raise the temperature of the catalyst to a suitable temperature for the reaction of hydrocarbon containing material on the catalyst.

16. A combined reformer and low temperature shift reactor as claimed in claim 1 in which the at least one reforming chamber, the at least one low temperature shift reaction chamber and the at least one steam generator are arranged in a common vessel.

17. A combined reformer and low temperature shift reactor as claimed in claim 16 in which the vessel is generally cylindrical, the vessel having a central longitudinal axis, the reforming chamber and steam generator are concentrically arranged about the central longitudinal axis of the vessel, the steam generator comprises a water containing tank, the at least one low temperature shift reaction chamber extends parallel to the central longitudinal axis through the water containing tank.

18. A combined reformer and low temperature shift reactor as claimed in claim 17 in which the hydrocarbon containing material, steam and oxygen containing gas are supplied at a first end of the reforming chamber, the first end having a mixing chamber.

19. A combined reformer and low temperature shift reactor as claimed in claim 18 in which a second end of the reforming chamber is open to allow product gases to leave the reforming chamber and the second end has means to retain the catalyst.

20. A combined reformer and low temperature shift reactor as claimed in claim 19 in which a cylindrical shroud is arranged concentrically between the cylindrical wall of the reforming chamber and the steam generator.

21. A combined reformer and low temperature shift reactor as claimed in claim 20 in which the pipes are arranged between the cylindrical shroud and the reforming chamber, the shroud is arranged over the second end of the reforming chamber to cause the product gases to flow through the space between the shroud and the reforming chamber, the steam generator has a member arranged over the first end of the reforming chamber to cause the product gases flowing through the shroud to flow through the space between the shroud and the steam generator.

22. A combined reformer and low temperature shift reactor as claimed in claim 20 in which the pipes are arranged between the cylindrical shroud and the steam generator, the shroud is arranged over the second end of the reforming chamber to cause the product gases to flow through the space between the shroud and the reforming chamber, the steam generator has a member arranged over the first end of the reforming chamber to cause the product gases flowing through the shroud to flow through the space between the shroud and the steam generator.

23. A combined reformer and low temperature shift reactor as claimed in claim 17, in which the reforming chamber is defined by a cylindrical wall, the steam generator is annular and is defined by an inner annular wall and an outer annular wall, the steam generator is arranged around and spaced from the reforming chamber.

24. A combined reformer and low temperature shift reactor as claimed in claim 23 in which the reforming chamber product gases are directed to flow through the space between the reforming chamber and the steam generator to transfer heat to the pipes and the steam generator.

25. A combined reformer and low temperature shift reactor as claimed in claim 23 in which the means to supply oxygen containing gas to the reforming chamber comprises a pipe extending through the space between the cylindrical wall of the reforming chamber and the inner annular wall of the steam generator.

26. A combined reformer and low temperature shift reactor as claimed in claim 23 in which the means to supply hydrocarbon containing material to the cylindrical wall of the reforming chamber comprises a pipe extending through the space between the reforming chamber and the inner annular wall of the steam generator.

27. A combined reformer and low temperature shift reactor as claimed in claim 26 in which the means to supply steam to the reforming chamber comprises a pipe extending through the space between the cylindrical wall of the reforming chamber and the inner annular wall of the steam generator.

28. A combined reformer and low temperature shift reactor as claimed in claim 27 in which the means to supply steam and the means to supply hydrocarbon containing material share a common pipe.

29. A combined reformer and low temperature shift reactor as claimed in claim 28 in which the hydrocarbon containing material is preheated by the reforming chamber product gases before the steam is mixed with the hydrocarbon containing material.

30. A combined reformer and low temperature shift reactor as claimed in claim 26, 27, 28 or 25 in which the the pipe is arranged in a helical coil.

31. A combined reformer and low temperature shift reactor comprising a reforming chamber containing a reforming catalyst,
    means to supply a hydrocarbon-containing material to the reforming chamber,
    means to supply oxygen-containing gas to the reforming chamber,
    means to supply steam to the reforming chamber
    the means to supply steam to the reforming chamber comprising a steam generator,
    at least one low temperature shift reaction chamber containing a low temperature shift reaction catalyst for producing product gases,
    means to transfer the reforming chamber product gases to the at least one low temperature shift reaction chamber,
    outlet means from the at least one low temperature shift reaction chamber for the flow of hydrogen and carbon dioxide,
    heat exchange means to transfer heat from the at least one low temperature shift reactor chamber to the steam generator, heating means being provided to heat the steam generator, said heating means comprising at least one hollow member extending through the steam generator, the at least one hollow member containing a combustion catalyst, means to supply an oxidant to the at least one hollow member and means to supply a portion of the product gases from the low temperature shift reaction chamber into the at least one hollow member.

32. A combined reformer and low temperature shift reactor as claimed in claim 31 in which the heating means comprises a plurality of hollow members.

33. A combined reformer, low temperature shift reactor and steam generator comprising at least one reforming chamber containing a reforming catalyst,
    a supply of hydrocarbon-containing material and a supply of oxygen-containing gas,
    a pipe to supply hydrocarbon containing material from the supply of hydrocarbon-containing material to the reforming chamber,
    a steam generator for generating steam from water,
    a supply of water,
    a pipe to supply water from the supply of water to the steam generator,
    a pipe to supply steam from the steam generator to the reforming chamber,
    at least one low temperature shift reaction chamber containing a low temperature shift reaction catalyst,
    a passage to supply the product gases from the at least one reforming chamber to the at least one low temperature shift reaction chamber for producing product gases,
    a passage for the flow of hydrogen and carbon dioxide out of the at least one low temperature shift reaction chamber,
    at least one heat exchange member being arranged to at least partially define the steam generator and to at least partially define the at least one low temperature shift reaction chamber, the at least one heat exchange member having one side thereof in contact with water and an opposite side thereof in contact with said shift reaction catalyst to allow the transfer of heat from the at least one low temperature shift reaction chamber to the steam generator.

34. A combined reformer, low temperature shift reactor and steam generator comprising at least one reforming chamber containing a reforming catalyst,
    a supply of hydrocarbon-containing material,
    a pipe to supply hydrocarbon-containing material from the supply of hydrocarbon-containing material to the reforming chamber,
    a supply of oxygen-containing gas,
    a pipe to supply oxygen-containing gas from the supply of oxygen-containing gas to the reforming chamber,
    a steam generator for generating steam from water,
    a supply of water,
    a pipe to supply water from the supply of water to the steam generator,
    a pipe to supply steam from the steam generator to the reforming chamber,
    at least one low temperature shift reaction chamber containing a low temperature shift reaction catalyst,
    a passage to supply the product gases from the at least one reforming chamber to the at least one low temperature shift reaction chamber,
    a passage for the flow of hydrogen and carbon dioxide out of the at least one low temperature shift reaction chamber,
    at least one heat exchange member being arranged to at least partially define the steam generator and to at least partially define the at least one low temperature shift reaction chamber, the at least one heat exchange member having one side in contact with water and an opposite side in contact with said shift reaction catalyst to allow transfer of heat from the at least one low temperature shift reaction chamber to the steam generator.

35. A combined low temperature shift reactor and steam generator comprising at least one low temperature shift reaction chamber containing a low temperature shift reaction catalyst,

- a supply of at least gaseous carbon monoxide and water,
- a supply of an oxygen-containing gas,
- a passage to supply at least gaseous carbon monoxide and water from the supply of at least gaseous carbon monoxide and water to the at least one low temperature shift reaction chamber with oxygen-containing gas from said supply of said oxygen-containing gas,
- a reformer chamber containing a reforming catalyst,
- a passage for the flow of hydrogen and carbon dioxide out of the at least one low temperature shift reaction chamber,
- a steam generator for generating steam from water,
- a supply of water,
- a pipe to supply water from the supply of water to the steam generator,
- a pipe to supply steam out of the steam generator,
- at least one heat exchange member being arranged to at least partially define the steam generator and to at least partially define the at least one low temperature shift reaction chamber, with said heat exchange member having one side thereof in contact with water and an opposite side in contact with said shift reaction catalyst to allow the transfer of heat from the at least one low temperature shift reaction chamber to the steam generator.

* * * * *